(12) United States Patent
Baba et al.

(10) Patent No.: US 9,885,629 B2
(45) Date of Patent: Feb. 6, 2018

(54) INSPECTION APPARATUS, INSPECTION METHOD, AND BATTERY-INSPECTING CHAMBER

(71) Applicant: Sony Corporation, Tokyo (JP)

(72) Inventors: Mamoru Baba, Fukushima (JP); Takeshi Sato, Fukushima (JP); Masaaki Kitaura, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 360 days.

(21) Appl. No.: 14/249,027

(22) Filed: Apr. 9, 2014

(65) Prior Publication Data

US 2014/0311223 A1   Oct. 23, 2014

(30) Foreign Application Priority Data

Apr. 19, 2013   (JP) .................................. 2013-088917

(51) Int. Cl.
*G01M 3/04* (2006.01)
*G01M 3/36* (2006.01)

(52) U.S. Cl.
CPC .................................. *G01M 3/363* (2013.01)

(58) Field of Classification Search
CPC ....................................................... G01M 3/363
USPC ............................................................ 73/49.8
See application file for complete search history.

(56) References Cited

U.S. PATENT DOCUMENTS

| 2013/0083496 A1* | 4/2013 | Franklin ............... G06F 1/1626 361/749 |
| 2013/0141571 A1 | 6/2013 | Yasooka et al. |
| 2014/0174150 A1* | 6/2014 | Yajima ................... H01M 10/48 73/23.2 |

FOREIGN PATENT DOCUMENTS

| JP | A HEI 02-186232 | 7/1990 |
| JP | A HEI 10-172618 | 6/1998 |
| JP | A 2002-208445 | 7/2002 |
| JP | 3983479 | 9/2007 |
| WO | WO 2011/158878 | 12/2011 |
| WO | 2012/020543 A1 | 2/2012 |

OTHER PUBLICATIONS

Office Action issued in JP Application 2013088917, dated Oct. 20, 2015 (17 pages).
Chinese Office Action (with English translation) dated Jun. 13, 2016 in corresponding Chinese application No. 2014101461823 (24 pages).

* cited by examiner

*Primary Examiner* — John Fitzgerald
*Assistant Examiner* — Rodney T Frank
(74) *Attorney, Agent, or Firm* — K&L Gates LLP

(57) ABSTRACT

An inspection apparatus includes a chamber and a pressurizer. The chamber includes a space portion configured to house at least a sealed portion of a battery, and an opening portion configured to open a partial portion of the battery other than the sealed portion to an atmosphere. The pressurizer is configured to put the space portion into a pressurized state.

17 Claims, 12 Drawing Sheets

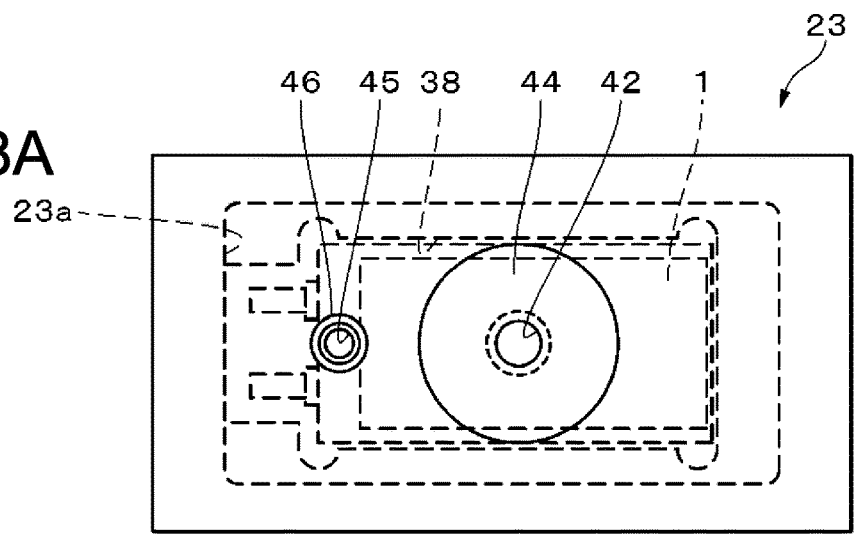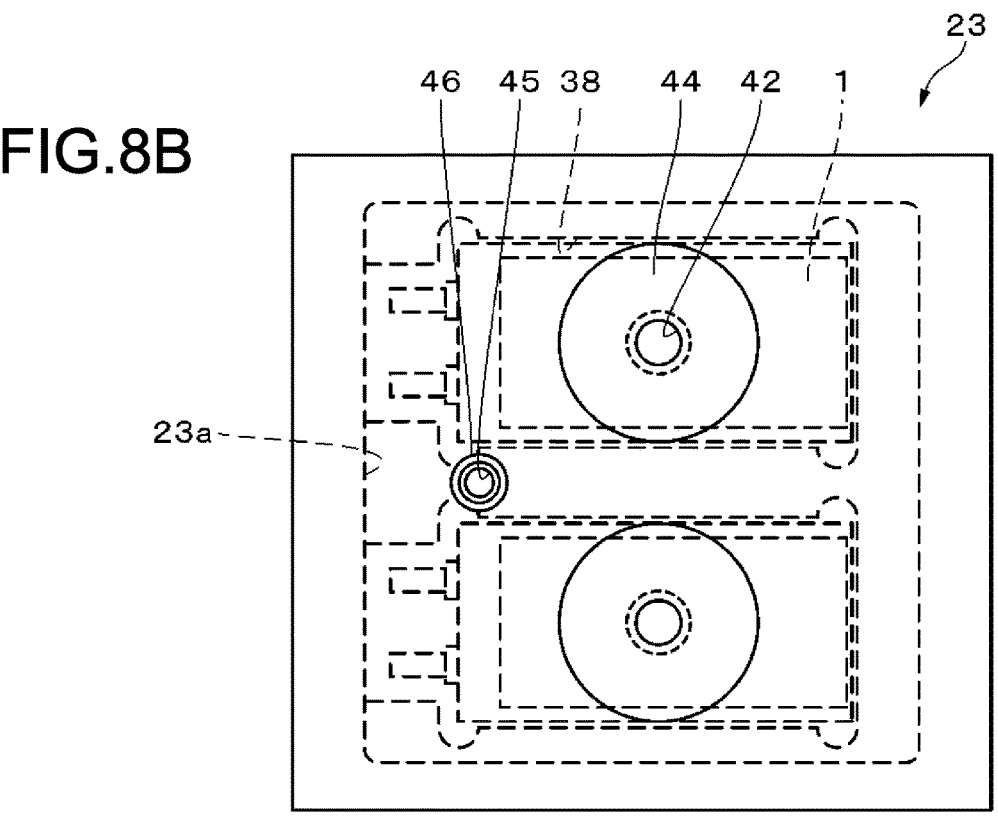

INSPECTION APPARATUS, INSPECTION METHOD, AND BATTERY-INSPECTING CHAMBER

CROSS REFERENCES TO RELATED APPLICATIONS

The present application claims priority to Japanese Priority Patent Application JP 2013-088917 filed in the Japan Patent Office on Apr. 19, 2013, the entire content of which is hereby incorporated by reference.

BACKGROUND

The present disclosure relates to an inspection apparatus, an inspection method, and a battery-inspecting chamber for inspecting an inspection target including a sealed portion.

In the related art, there are widely used batteries each including a battery element covered with an exterior material such as a laminate film. In a manufacture process of such a battery, a battery-sealed state is inspected for checking whether or not a completed battery has a sealing failure.

As an inspection apparatus for inspecting the battery-sealed state, for example, there has been proposed one that houses a battery in a hermetically sealed container pressurized or depressurized, measures a change in pressure from a state before the pressurization or depressurization, and determines the presence of a leakage if a large change in pressure above a predetermined threshold value is measured (e.g., see Japanese Patent No. 3983479). In recent years, it is desirable to provide an inspection apparatus capable of inspecting the battery-sealed state in a short time.

SUMMARY

Therefore, it is desirable to provide an inspection apparatus, an inspection method, and a battery-inspecting chamber, by which a battery-sealed state can be inspected in a short time.

According to a first embodiment of the present disclosure, there is provided an inspection apparatus including: a chamber including a space portion configured to house at least a sealed portion of a battery, and an opening portion configured to open a partial portion of the battery other than the sealed portion to an atmosphere; and a pressurizer configured to put the space portion into a pressurized state.

According to a second embodiment of the present disclosure, there is provided an inspection method including: housing at least a sealed portion of a battery in a space portion of a chamber; and putting the space portion into a pressurized state and opening the partial portion of the battery other than the sealed portion to an atmosphere.

According to a third embodiment of the present disclosure, there is provided a battery-inspecting chamber including: a space portion configured to house at least a sealed portion of a battery; and an opening portion configured to open a partial portion of the battery other than the sealed portion to an atmosphere.

According to a fourth embodiment of the present disclosure, there is provided an inspection apparatus including: a chamber including a space portion configured to house at least a sealed portion of an inspection target, and an opening portion configured to open a partial portion of the inspection target other than the sealed portion to an atmosphere; and a pressurizer configured to put the space portion into a pressurized state.

In the first to third embodiments, at least the sealed portion of the battery is housed in the space portion of the chamber. The space portion is put into the pressurized state and the partial portion of the battery other than the sealed portion is opened to the atmosphere. Therefore, if the battery has a sealing failure, the gas pressure within the battery is higher than the external atmospheric pressure in the opening portion, and swelling of the battery is generated in the opening portion. By a worker or the like visually checking the swelling or by a measurement apparatus such as a position sensor measuring the swelling, the presence or the absence of the sealing failure of the battery can be checked. Further, a pressurized atmosphere is used as the atmosphere in the chamber, and hence it is possible to reduce an inspection time in comparison with an inspection method using a vacuum atmosphere as the atmosphere in the chamber.

As described above, according to the embodiments of the present disclosure, it is possible to inspect the battery-sealed state in a short time.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIGS. 8A and 8B are plane views showing a modified example of the chamber according to the first embodiment of the present disclosure;

DETAILED DESCRIPTION

Hereinafter, embodiments of the present disclosure will be described with reference to the drawings in the following order. Note that the same or corresponding portions are denoted by the same reference symbols in all the figures relating to the following embodiments.

1 First Embodiment (First Example of Inspection Apparatus)
   1.1 Configuration of Battery
   1.2 Configuration of Inspection Apparatus
   1.3 Configuration of Chamber
   1.4 Inspection Method
   1.5 Effect
   1.6 Modified Example
2 Second Embodiment (Second Example of Inspection Apparatus)
   2.1 Configuration of Inspection Apparatus
   2.2 Inspection Method
   2.3 Effect
   2.4 Modified Example
3 Third Embodiment (Example of Chamber)
   3.1 Configuration of Chamber
   3.2 Inspection Method
   3.3 Effect
   3.4 Modified Example

1. First Embodiment

1.1 Configuration of Battery

Figure 1A:
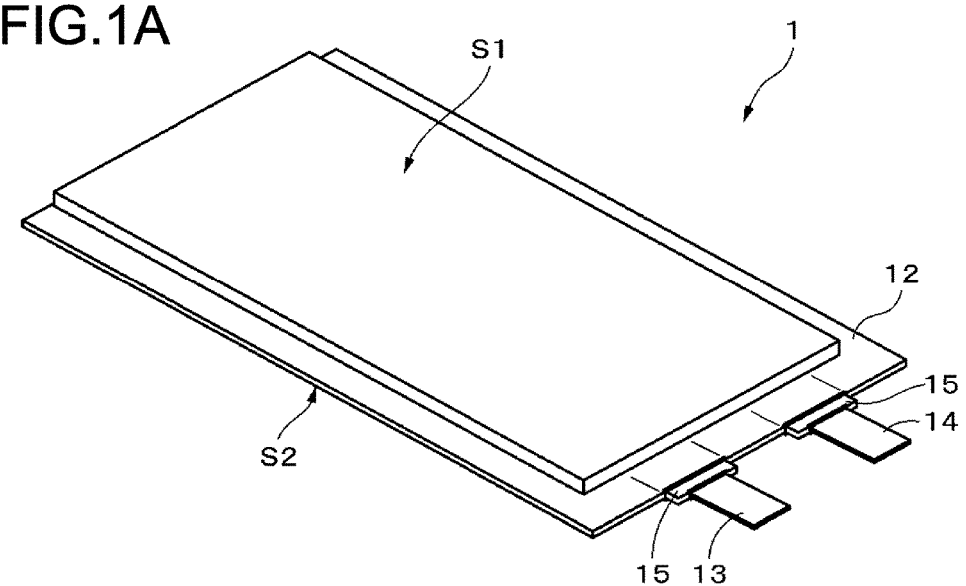
FIG. 1A is a perspective view showing an exemplary outer appearance as a battery serving as an inspection target is viewed from a side of one main surface.
Figure 1B:
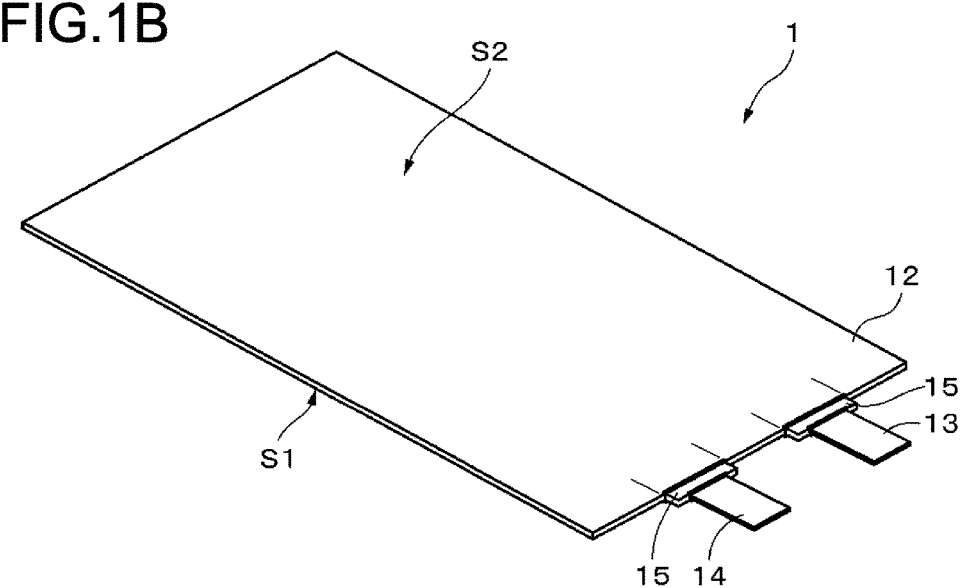
FIG. 1B is a perspective view showing an exemplary outer appearance as the battery serving as the inspection target is viewed from a side of the other main surface.
Figure 2:
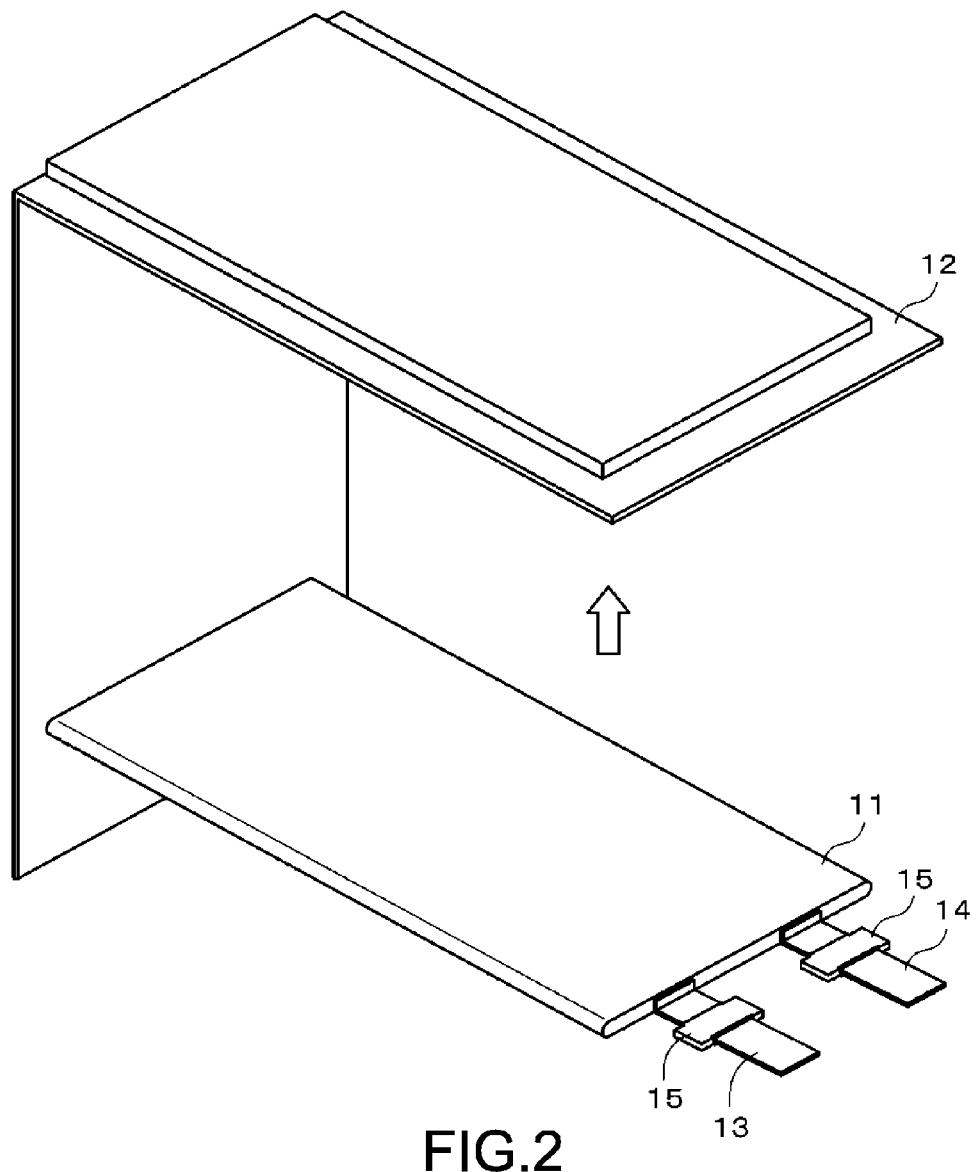
FIG. 2 is an exploded perspective view showing an exemplary configuration of the battery serving as the inspection target.

First, referring to FIGS. 1A, 1B, and 2, a configuration of a battery 1 serving as the inspection target will be described. The battery 1 is a flat battery including two main surfaces S1 and S2. The battery 1 is manufactured by covering a battery element 11 provided with a positive electrode lead 13 and a negative electrode lead 14 with an exterior material 12. Thus, reductions in size, weight, and thickness can be achieved. Hereinafter, an end surface side of the battery element 11, from which the positive electrode lead 13 and the negative electrode lead 14 are pulled out, will be referred to as a top side. Further, an end surface side opposite to the former end surface side will be referred to as a bottom side. In addition, a side of side portions between both end portions on the top side and the bottom side will be referred to as a middle side.

Each of the positive electrode lead 13 and the negative electrode lead 14 extends from an inside to an outside of the exterior material 12, and is pulled out in the same direction, for example. The positive electrode lead 13 and the negative electrode lead 14 are, for example, made of a metal material such as an aluminum, a copper, a nickel, and a stainless steel and formed in a thin-plate shape or a net-like shape.

The battery 1 includes a sealed portion(s) in all the side portions or some of the side portions. Note that FIGS. 1A, 1B, and 2 show an example in which side portions on the top side and the middle side out of the side portions of the battery 1 include the sealed portions. The sealed portions are formed in the following manner. Specifically, for example, one rectangular exterior material 12 is folded back at its center and bonded by thermal fusion or the like while sandwiching the battery element 11 and overlapping the folded-back side portions with each other. Alternatively, the battery 1 is sandwiched between two rectangular exterior materials 12 and bonded by thermal fusion while overlapping the side portions with each other.

The exterior material 12 is, for example, a soft laminate film. The exterior material 12 has a configuration in which, for example, a thermal fusion resin layer, a metal layer, and a surface protection layer are sequentially stacked. Note that a surface on a side of the thermal fusion resin layer is a surface on a side on which the battery element 11 is housed. Examples of the thermal fusion resin layer include a polymer material such as a polypropylene (PP) and a polyethylene (PE). Examples of the material of the metal layer include a metal material such as an aluminum (Al) or an alloy thereof. Examples of the material of the surface protection layer include a polymer material such a nylon (Ny). Specifically, for example, the exterior material 12 is formed of, for example, a rectangular aluminum laminate film in which a nylon film, an aluminum film, and a polyethylene film are bonded in the stated order. For example, the exterior material 12 is provided such that a polyethylene film side and the battery element 11 are opposed to each other and the respective side portions are bonded to each other by fusion or with an adhesive. Adhesive films 15 for enhancing sealing properties are inserted between the exterior material 12 and the positive electrode lead 13 and negative electrode lead 14. Each of the adhesive films 15 is formed of a material having an adhesion to the positive electrode lead 13 and the negative electrode lead 14, for example, a polyolefin resin such as a polyethylene, a polypropylene, a modified polyethylene, and a modified polypropylene.

Note that a laminate film having another configuration, a polymer film of a polypropylene or the like, a metal film, or the like may be used as the exterior material 12 instead of the laminate film having the above-mentioned structure.

Although the configuration of the battery element 11 is not particularly limited, the examples of the configuration of the battery element 11 may include a wiring electrode structure and a stack electrode structure. As an electrolyte of the battery element 11, for example, an electrolytic solution, a gel-like electrolyte, or a solid electrolyte is used.

1.2 Configuration of Inspection Apparatus

Figure 3:
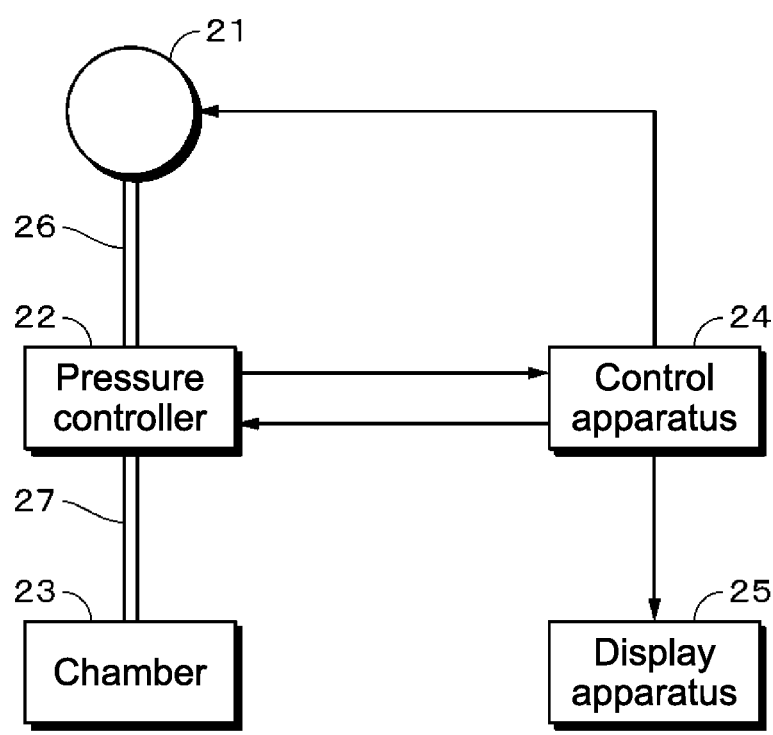
FIG. 3 is a schematic view showing an exemplary configuration of an inspection apparatus according to a first embodiment of the present disclosure.

Next, referring to FIG. 3, a configuration of the inspection apparatus that inspects a sealed state of the battery 1 having the above-mentioned configuration will be described. The inspection apparatus includes a pressurizer 21, a pressure controller 22, a chamber 23, a control apparatus 24, and a display apparatus 25. The pressurizer 21 and the pressure controller 22 are connected to each other via a communication pipe 26. The pressure controller 22 and the chamber 23 are connected to each other via a communication pipe 27.

The pressurizer 21 puts the chamber 23 into a pressurized state. The pressurizer 21 is, for example, a compressor, and compresses gas such as the air and supplies the gas into the chamber 23 via the pressure controller 22 as compressed gas.

The pressure controller 22 includes a regulator. The pressure controller 22 adjusts a pressure of the compressed gas supplied from the pressurizer 21 into a predetermined pressure by this regulator and supplies the adjusted compressed gas into the chamber 23. The pressure controller 22 may further include an air filter depending on needs. The pressure controller 22 may prevent moisture and foreign particles in the compressed gas from entering the pressure controller 22 by the air filter. The pressure controller 22 may further include a pressure gauge depending on needs. The pressure controller 22 may check an adjusted pressure in the pressure controller 22 by the pressure gauge.

The compressed gas is supplied from the pressurizer 21 into the chamber 23 via the pressure controller 22. The chamber 23 houses at least the sealed portion of the battery 1 and causes a partial portion of each of the main surfaces S1 and S2 of the battery 1 to be exposed from the chamber 23. Thus, in the chamber 23 under the pressurized state, the partial portion of each of the main surfaces S1 and S2 of the battery 1 is opened to the atmosphere.

The control apparatus 24 controls the pressurizer 21 and the pressure controller 22. Specifically, the control apparatus 24 outputs a control signal to the pressurizer 21 and controls a gas-compressing operation of the pressurizer 21. Further, the control apparatus 24 outputs a control signal to the pressure controller 22 and adjusts the pressure of the compressed gas supplied from the pressurizer 21 to the chamber 23 into a predetermined pressure. With this, the chamber 23 is controlled to have the predetermined pressure. Further, the control apparatus 24 displays, based on a supply signal supplied from the pressure controller 22, information on a control state or the like of the pressure controller 22 on the display apparatus 25.

The display apparatus 25 is one of examples of the output unit, and displays, based on a signal supplied from the control apparatus 24, information on a control state or the like of the pressurizer 21 and the pressure controller 22. As the display apparatus 25, for example, a liquid-crystal display or an electro luminescence (EL) display may be used.

1.3 Configuration of Chamber

Figure 4A:
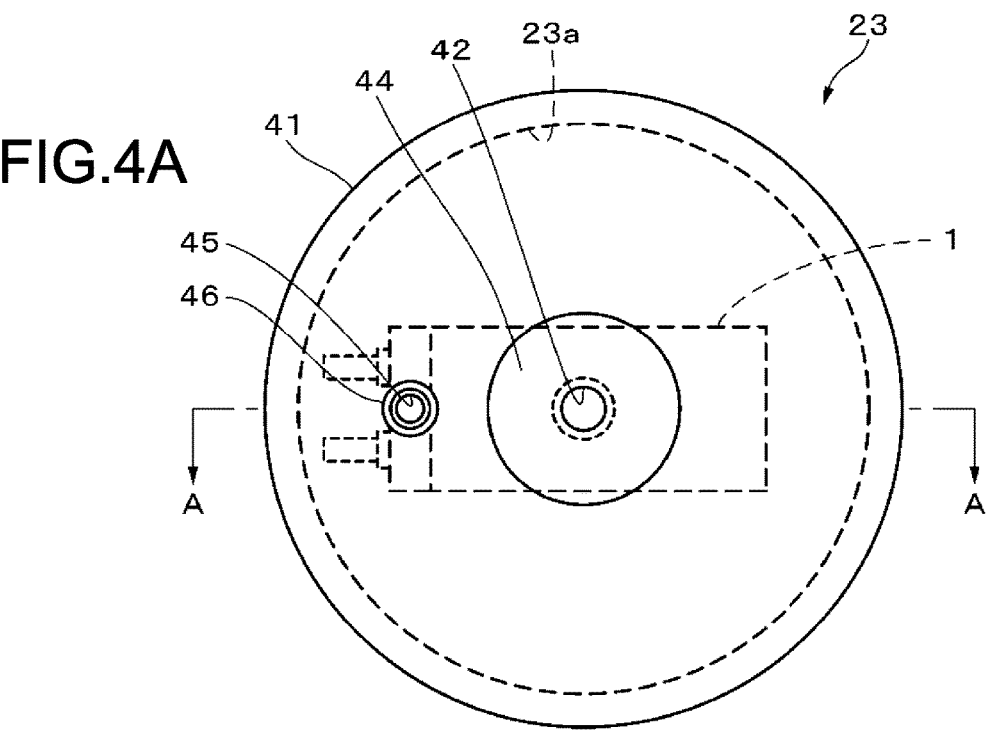
FIG. 4A is a plane view showing an exemplary outer appearance of a chamber according to the first embodiment of the present disclosure.
Figure 4B:
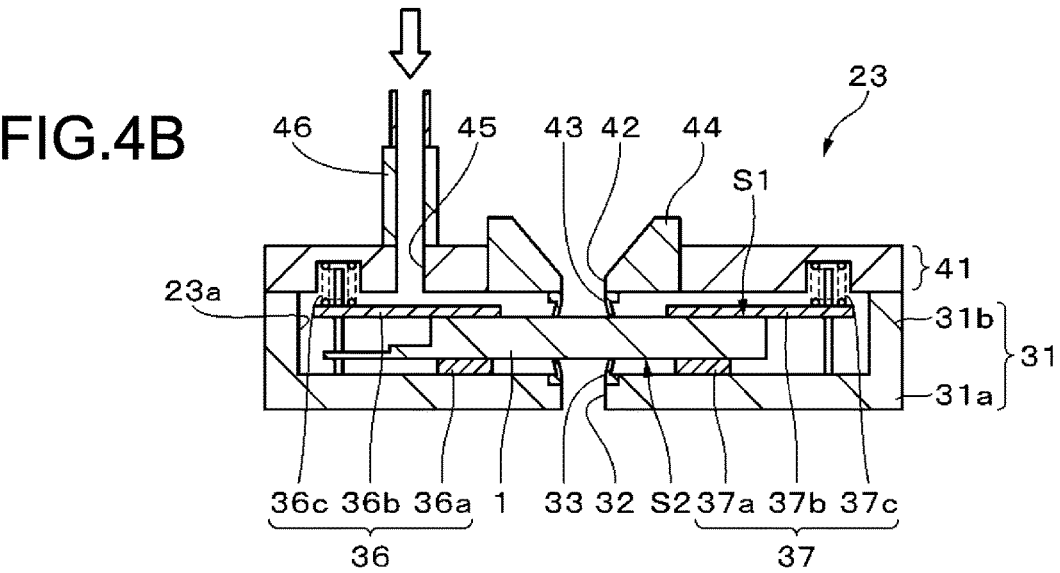
FIG. 4B is a cross-sectional view taken along the line A-A of FIG. 4A.

Next, referring to FIGS. 4A and 4B, a configuration of the above-mentioned chamber 23 will be described in detail. The chamber 23 serving as a battery-inspecting chamber has a disk shape, and includes a space portion 23a for housing at least the sealed portion of the battery 1 therein. A lower surface and an upper surface of the chamber 23 are provided with hole portions 32 and 42. In a state in which the battery 1 is housed at a predetermined position within the chamber 23, the partial portions of the main surfaces S1 and S2 of the battery 1 (e.g., center portions of the main surfaces S1 and S2) are exposed from the chamber 23 through the hole portions 32 and 42. With this, in the pressurized state of the space portion 23a, the partial portions of the main surfaces S1 and S2 of the battery 1 are opened to the atmosphere through the hole portions 32 and 42. Note that, in this example, the partial portions of the main surfaces S1 and S2 of the battery 1 are partial portions of the battery 1 other than the sealed portion. Although the shape of the hole portions 32 and 42 is not particularly limited, examples of the shape of the hole portions 32 and 42 may include a circular shape, an elliptical shape, and a polygonal shape such as a rectangular shape and a hexagonal shape. Here, the shape of the hole portions 32 and 42 means a shape as the hole portions 32 and 42 are viewed in a direction perpendicular to the lower surface and the upper surface.

The chamber 23 includes a chamber lower portion 31 and a chamber upper portion 41 that are configured to be separable from each other. By combining the chamber lower portion 31 and the chamber upper portion 41, the space portion 23a for housing the battery 1 is formed. The hole portions 42 and 32 are arranged in centers of the chamber upper portion 41 and the chamber lower portion 31, respectively. Note that the arrangement of the hole portions 32 and 42 is not limited to this example, and the hole portions 32 and 42 do not need to overlap with each other, but may be offset with respect to each other in a thickness direction of the chamber 23 in a state in which the chamber lower portion 31 and the chamber upper portion 41 are combined.

In rims of the hole portions 32 and 42 on a side of the space portion 23a, the packings 33 and 43 having a shape conforming with the hole portions 32 and 42 are provided, respectively. In a state in which the battery 1 is housed in the space portion 23a, the packing 33 is provided between the rim of the hole portion 32 on the side of the space portion 23a and the main surface S2 of the battery 1 and the packing 43 is provided between the rim of the hole portion 42 on the side of the space portion 23a and the main surface S1 of the battery 1. The space portion 23a is closed by the packings 33 and 43 and thus the compressed gas is prevented from leaking from the space portion 23a to an outside. The material of the packings 33 and 43 only need to be capable of preventing the leakage of the compressed gas and is not particularly limited. Examples of the material of the packings 33 and 43 may include a rubber-based material such as a nitrile rubber, a fluoro-rubber, a urethane rubber, a silicone rubber, an acrylic rubber, an ethylene-propylene rubber, and a styrene-butadiene rubber.

The chamber lower portion 31 is a housing portion for housing the battery 1, and includes, for example, a main-body portion 31a having a circular shape and a peripheral wall portion 31b provided in a rim of the main-body portion 31a. In a center portion of the main-body portion 31a, the hole portion 32 passing from one main surface to the other main surface is provided. Via the hole portion 32, the partial portion of the main surface S2 of the battery 1 housed in the chamber 23 is exposed.

The chamber upper portion 41 is, for example, a lid portion having a circular shape or the like that is disposed on the chamber lower portion 31. In a center portion of the chamber upper portion 41, the hole portion 42 passing from one main surface to the other main surface is provided. The partial portion of the main surface S1 of the battery 1 housed in the chamber 23 is exposed through the hole portion 42. Further, a supply port 45 is provided at a position displaced from the center of the chamber upper portion 41. The compressed gas is supplied from the pressurizer 21 into the chamber 23 via the supply port 45. The supply port 45 is provided with a connection portion 46. The communication pipe 27 is connected to the supply port 45 via the connection portion 46.

The chamber upper portion 41 may include a packing holder 44 for holding the packing 43. Further, the packing holder 44 may be configured to be movable in a direction closer to or away from the main surface S1 of the battery 1 housed at a predetermined position within the space portion 23a. In a case where such a configuration is adopted, a close contact property between an edge of the packing 43 and the main surface S1 of the battery can be enhanced by the movement of the packing holder 44. The packing holder 44 only needs to be configured to be capable of holding the packing 43, and the shape thereof is not particularly limited. Although the configuration in which only the chamber upper portion 41 includes the packing holder 44 is described as an example herein, the chamber lower portion 31 may also include a packing holder.

Within the chamber 23, support sections 36 and 37 for supporting the battery 1 are provided. The support section 36 supports a portion on the top side of the battery 1. The support section 37 supports a portion of on the bottom side of the battery 1. By supporting the battery 1 in this manner, when the compressed gas is supplied into the space portion 23a, it is possible to prevent the battery 1 from being displaced due to the compressed gas. Further, due to the support of the battery 1, a space can be formed between an inner side surface of the main-body portion 31a and the main surfaces S1 and S2 of the battery 1. By forming the space in this manner, the compressed gas can also flow to the main surfaces S1 and S2 of the battery 1, and hence a pin hole of the main surfaces S1 and S2 of the battery 1 can be also inspected.

The support section 36 includes supporting members 36a and 36b and a position adjuster 36c. The supporting member 36a is provided in an inner side surface of the main-body portion 31a of the chamber lower portion 31. A portion on the top side of the main surface S2 of the battery 1 is disposed on the supporting member 36a. The supporting member 36b is connected to the position adjuster 36c. A position of the supporting member 36b is adjusted by the position adjuster 36c. The portion on the top side of the main surface S2 of the battery 1 is disposed on the supporting member 36a and a position of the supporting member 36b is adjusted by the position adjuster 36c. Therefore, the portion on the top side of the battery 1 is sandwiched and supported by the supporting members 36a and 36b.

The support section 37 includes supporting members 37a and 37b and a position adjuster 37c. The supporting member 37a is provided in an inner side surface of the main-body portion 31a of the chamber lower portion 31. A portion on the bottom side of the main surface S2 of the battery 1 is disposed on the supporting member 37a. The supporting member 37b is connected to the position adjuster 37c and a position of the supporting member 37b is adjusted by the position adjuster 37c. The portion on the bottom side of the main surface S2 of the battery 1 is disposed on the supporting member 37a and a position of the supporting member 37b is adjusted by the position adjuster 37c. In this manner, the portion on the bottom side of the battery 1 is sandwiched and supported by the supporting members 37a and 37b.

The supporting members 36a and 37a may be fixed on the inner side surface of the main-body portion 31a of the chamber lower portion 31 or the supporting members 37a and 37a may be a partial portion of the chamber lower portion 31.

1.4 Inspection Method

Figure 5:
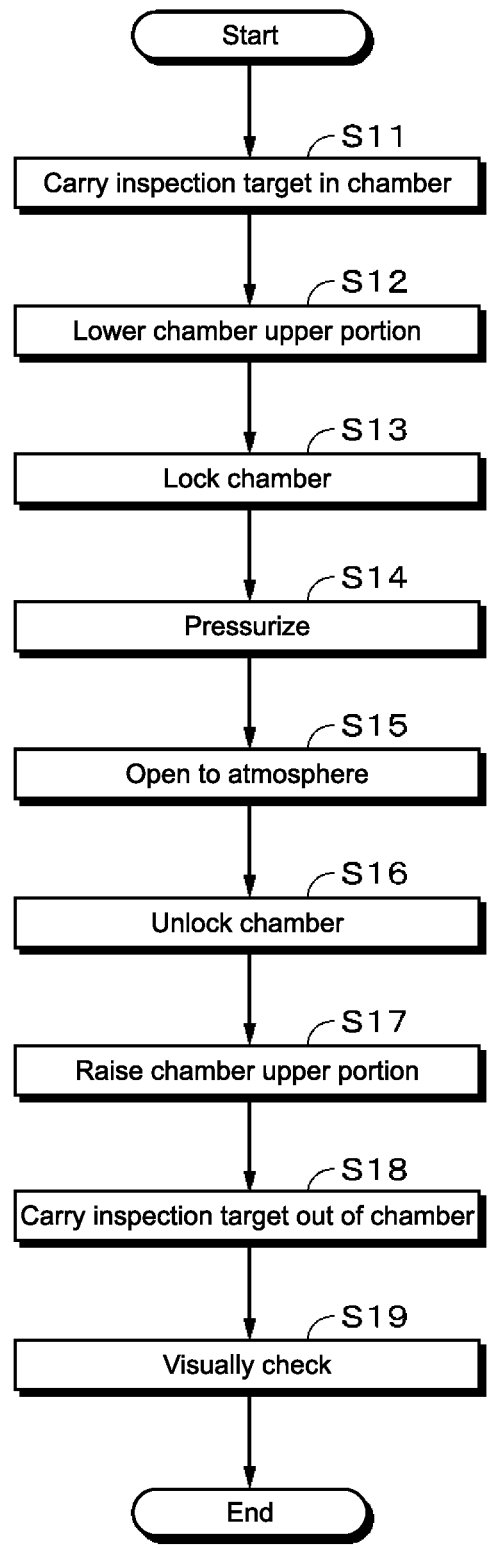
FIG. 5 is a flowchart for explaining an exemplary inspection method according to the first embodiment of the present disclosure.

Next, referring to FIG. 5, an inspection method for the battery using the inspection apparatus having the above-mentioned configuration will be described. First, in S11, the battery 1 serving as the inspection target is carried in the chamber lower portion 31. The portion on the top side of the battery 1 is sandwiched and supported by the supporting members 36a and 36b and the portion on the bottom side of the battery 1 is sandwiched and supported by the supporting members 37a and 37b. Subsequently, in Step S12, the chamber upper portion 41 is lowered and the rim of the chamber upper portion 41 is disposed on the peripheral wall portion 31b of the chamber lower portion 31. An upper end of the peripheral wall portion 31b of the chamber lower portion 31 and the rim of the chamber upper portion 41 are held in close contact with each other. With this, the space portion 23a is formed in the chamber 23, and the space portion 23a houses at least the sealed portion of the battery 1 while the partial portions of the main surfaces S1 and S2 of the battery 1 are exposed through the hole portions 42 and 32, respectively.

Next, in Step S13, the chamber 23 is locked. Subsequently, in Step S14, the compressed gas such as the compressed air is supplied to the space portion 23a of the chamber 23 and the space portion 23a is put into a compressed state. At this time, the compressed atmosphere of the space portion 23a is set to, for example, approximately 0.3 MPa to 0.5 MPa.

Figure 6A:
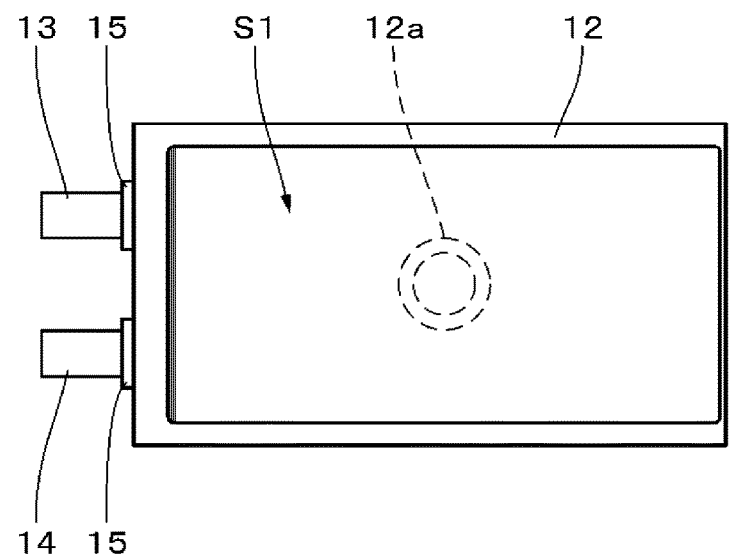
FIG. 6A is a plane view showing an exemplary outer appearance of the battery after an inspection, which has a sealing failure, a pin hole, or the like in an exterior material.
Figure 6B:
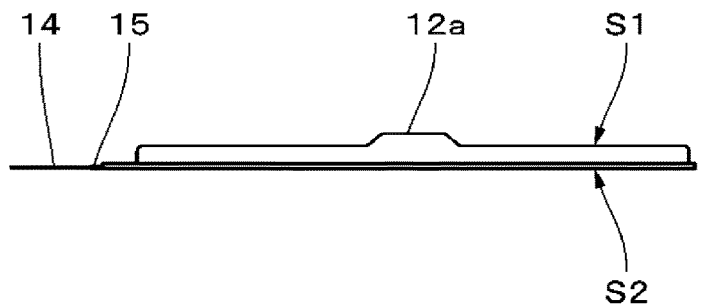
FIG. 6B is a side view showing the exemplary outer appearance of the battery after the inspection, which has the sealing failure, the pin hole, or the like in the exterior material.
Figure 7A:
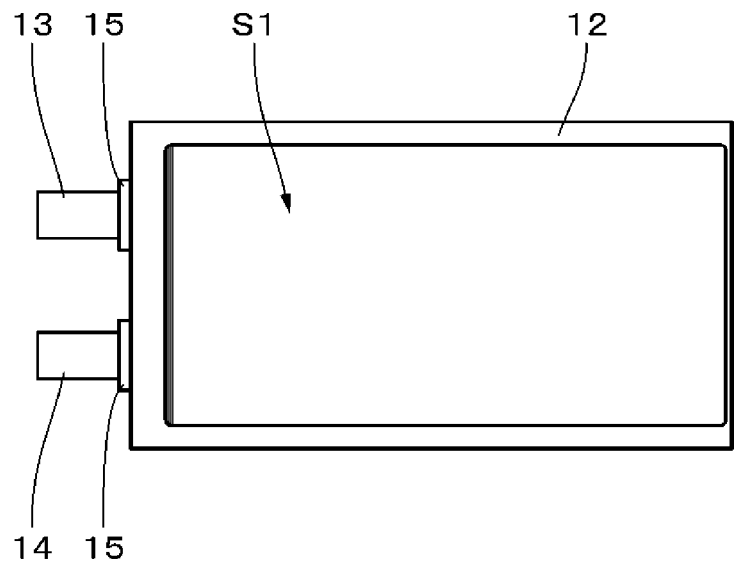
FIG. 7A is a plane view showing an exemplary outer appearance of the battery after an inspection, which does not have a sealing failure, a pin hole, or the like in an exterior material.
Figure 7B:
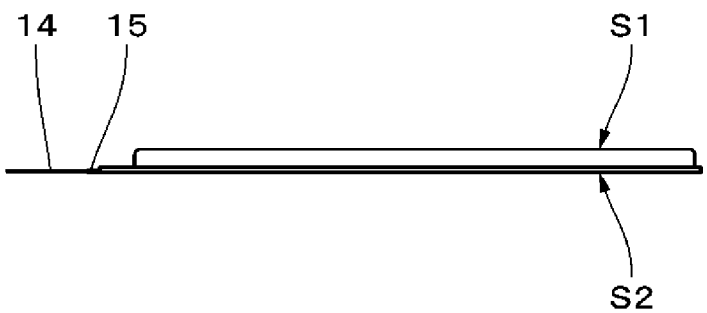
FIG. 7B is a side view showing the exemplary outer appearance of the battery after the inspection, which does not have the sealing failure, the pin hole, or the like in the exterior material.

The space portion 23a is put into the compressed state in this manner, and hence the portion of the battery 1 that is situated in the space portion 23a is compressed due to the compressed gas while the portions that is exposed through the hole portions 32 and 42 are opened to the atmosphere. Thus, if a portion of the exterior material 12 that is situated in the space portion 23a has a sealing failure, a pin hole, or the like, the compressed gas enters the battery through that portion and the exterior material 12 in the portions opened to the atmosphere through the hole portions 32 and 42 is swollen with the result that a swelling deformation 12a is generated (see FIGS. 6A and 6B). The swelling deformation 12a is a plastic deformation, and hence kept also after the chamber 23 is opened to the atmosphere. On the other hand, if the portion of the exterior material 12 that is situated in the space portion 23a does not have a sealing failure, a pin hole, or the like, the compressed gas does not enter the battery through that portion, and hence the exterior material 12 in the portions opened to the atmosphere through the hole portions 32 and 42 does not change before and after the pressurization (see FIGS. 7A and 7B).

Next, in Step S15, the chamber 23 is opened to the atmosphere. Subsequently, in Step S16, the lock of the chamber 23 is released. Subsequently, in Step S17, after the chamber upper portion 41 is raised, the support of the portion on the top side of the battery 1 by the supporting members 36a and 36b is released and the support of the portion on the bottom side of the battery 1 by the supporting members 37a and 37b is released. Subsequently, in Step S18, the battery 1 is carried out of the chamber lower portion 31. Subsequently, in Step S19, the main surfaces S1 and S2 of the battery 1 are visually observed. If the swelling deformation 12a is observed in the main surfaces S1 and S2 in the visual observation (see FIGS. 6A and 6B), it can be determined that the battery 1 has a sealing failure, a pin hole, or the like. On the other hand, if the swelling deformation 12a is not observed in the main surfaces S1 and S2 in the visual observation (see FIGS. 7A and 7B), it can be determined that the battery 1 does not have a sealing failure, a pin hole, or the like. In the above-mentioned manner, the inspection of the battery 1 is completed.

Note that the operations in S11 to S18 may be performed under an automatic control of the control apparatus 24. In this case, the operation of carrying in and out the battery 1 only needs to be performed using a carry-in arm and a carry-out arm, or the like.

1.5 Effect

In the inspection apparatus according to the first embodiment, the chamber 23 includes the space portion 23a for housing at least the sealed portion out of the entire battery 1, and the hole portions 32 and 42 for causing the partial portion of the battery 1 other than the sealed portion (the partial portions of the main surfaces S1 and S2 of the battery 1) to be exposed. Thus, when the compressed gas is supplied to the space portion 23a of the chamber 23, the sealed portion or the like housed in the space portion 23a is compressed while the partial portion of the battery 1 other than the sealed portion is kept opened to the atmosphere through the hole portions 32 and 42. With this, if the exterior material 12 has the sealing failure or the pin hole and the compressed gas enters the battery through that portion, the gas pressure within the exterior material 12 is higher than the external atmospheric pressure at positions of the hole portions 32 and 42. Therefore, at the positions of the hole portions 32 and 42, the swelling deformation 12a is generated in the exterior material 12. By a worker or the like visually checking the swelling deformation 12a, it is possible to determine that the sealing failure or the pin hole is generated in the exterior material 12 of the battery 1 serving as the inspection target.

In a method of inspecting the sealed state of the battery 1 using a vacuum state (hereinafter, referred to as "vacuum-type inspection method"), if the exterior material 12 does not have the sealing failure or the pin hole and the battery 1 is a good product, the exterior material 12 of the battery 1 swells. The battery 1 whose the exterior material 12 swells in this manner is a good product, and hence the exterior material 12 needs to be returned to an original state after being opened to the atmosphere. Therefore, the swelling deformation of the exterior material 12 needs to be an elastic deformation. On the other hand, if the exterior material 12 has the sealing failure or the pin hole, the exterior material 12 of the battery 1 rarely changes. In the vacuum-type inspection method, by visually observing a difference in state or the like, the sealed state of the battery 1 can be checked. However, in this vacuum-type inspection method, the swelling deformation of the exterior material 12 is the elastic deformation, and hence the presence and absence of the sealing failure or the pin hole of the battery 1 can be checked only in the state in which the vacuum state is kept. In contrast, in the inspection according to the first embodiment, the swelling deformation 12a of the exterior material 12 is the elastic deformation, and hence the swelling deformation 12a is kept also after being opened to the atmosphere. Thus, the check of the swelling deformation 12a does not necessarily needs to be performed in the pressurized state and may also be performed after being opened to the atmosphere. Thus, in the inspection method according to the first embodiment, it is possible to easily check the presence and the absence of the sealing failure or the pin hole of the battery 1 in comparison with the vacuum-type inspection method.

1.6 Modified Example

Although the chamber 23 has a disk shape in the first embodiment described above, the shape of the chamber 23 is not limited thereto. For example, as shown in FIG. 8A, the chamber 23 may have a cubic shape. Further, the chamber 23 may further include a positioning portion 38 for positioning the battery 1 in the space portion 23a.

Further, although the chamber 23 houses the single battery 1 in the first embodiment described above, the chamber 23 may house a plurality of batteries 1 as shown in FIG. 8B. In this case, pairs of hole portions 32 and 42 corresponding to the number of the battery 1 that can be housed are provided and the partial portions of the main surfaces S1 and S2 of the battery 1 are exposed from the chamber 23 through the hole portions 32 and 42.

Further, although the inspection apparatus includes the single chamber 23 in the first embodiment described above, the inspection apparatus may include a plurality of chambers 23. In this case, the chamber 23 may be configured to house a plurality of batteries 1 as described above.

Further, although the chamber lower portion 31 and the chamber upper portion 41 include the hole portions 32 and 42, respectively in the first embodiment described above, the configuration of the chamber 23 is not limited thereto. For example, a hole portion may be provided in at least one of the chamber lower portion 31 and the chamber upper portion 41.

Further, although the battery 1 is kept in the pressurized state only one time in the first embodiment described above, the battery 1 may be kept in the pressurized state two times by changing the position at which the surface of the battery 1 is exposed through the hole portions 32 and 42. Specifically, by changing the position at which the surface of the battery 1 is exposed through the hole portions 32 and 42, the operations in Steps S11 to S18 shown in FIG. 5 may be repeated two times. With this, even if the pin hole or the like is present at a position exposed through the hole portions 32 and 42 in a first pressurized state, the swelling deformation 12a is not generated in the battery surface, and the presence of the pin hole or the like cannot be checked, the swelling deformation 12a is generated in the battery surface in a second pressurized state, and hence the presence of the pin hole or the like can be checked. Thus, a detection accuracy of the pin hole or the like can be enhanced.

Further, in the first embodiment described above, the inspection apparatus may further include an exhaust portion such as a vacuum pump. The exhaust portion may put the chamber 23 into a vacuum state and then into the pressurized state. By doing so, if the sealed portion of the battery 1 has an insufficient sealed point, the insufficient sealed point can be opened due to the vacuum state. Therefore, in the pressurized state, the compressed gas can flow into the battery through the opened sealed point. Thus, it is also possible to check the insufficient sealed point.

2. Second Embodiment 2.1 Configuration of Inspection Apparatus

Figure 9:
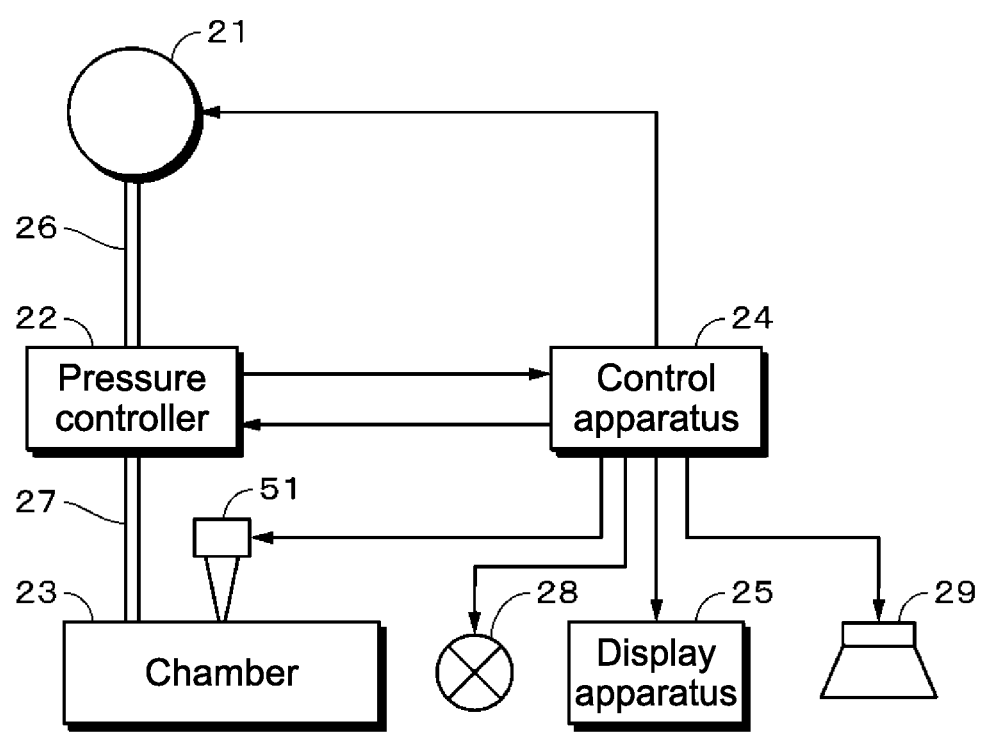
FIG. 9 is a schematic view showing an exemplary configuration of an inspection apparatus according to a second embodiment of the present disclosure.
Figure 10A:
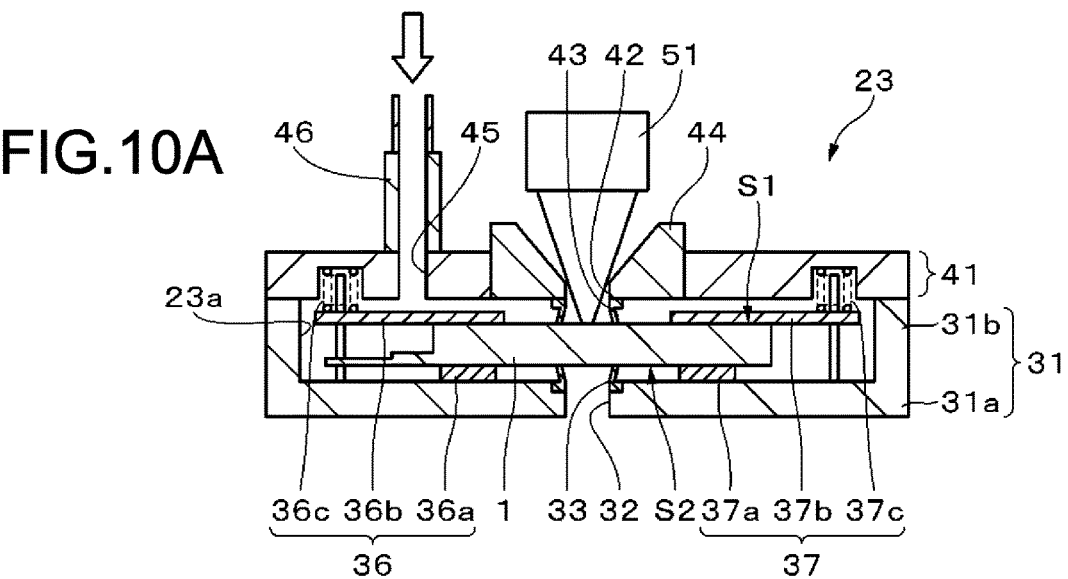
FIG. 10A is a cross-sectional view showing exemplary displacement sensor and chamber of the inspection apparatus shown in FIG. 9.

As shown in FIG. 9, an inspection apparatus according to the second embodiment of the present disclosure is different from the inspection apparatus according to the first embodiment in that the former further includes a displacement sensor (measurement unit) 51. The displacement sensor S1 is provided in vicinity of the hole portion 42 of the chamber 23 as shown in FIG. 10A. The displacement sensor 51 measures an amount of displacement of the surface of the battery 1 upon pressurization of the chamber 23 through the hole portion 42. As the displacement sensor 51, for example, either one of displacement sensors of a contact type and a non-contact type may be used. Note that FIGS. 9 and 10 show an example in which an optical sensor such as a laser focus sensor is used. The displacement sensor 51 is controlled based on a control signal from the control apparatus 24. Further, upon pressurization of the chamber 23, the displacement sensor 51 provides the measured amount of displacement to the control apparatus 24. The control apparatus 24 determines, based on the amount of displacement provided from the displacement sensor 51, whether or not the battery 1 serving as the inspection target has the sealing failure, and displays a result thereof on the display apparatus 25 as visual information.

The inspection apparatus may further include a lamp 28 and the worker may be informed of the inspection result as the visual information by flashing of the lamp 28 or the like. Examples of the lamp 28 include a light-emitting element such as a light bulb and an LED (Light Emitting Diode). Further, the inspection apparatus may include an audio output section 29 such as a speaker and the worker may be informed of the inspection result as audio information such as alarm sound by the audio output section 29.

2.2 Inspection Method

Figure 11:
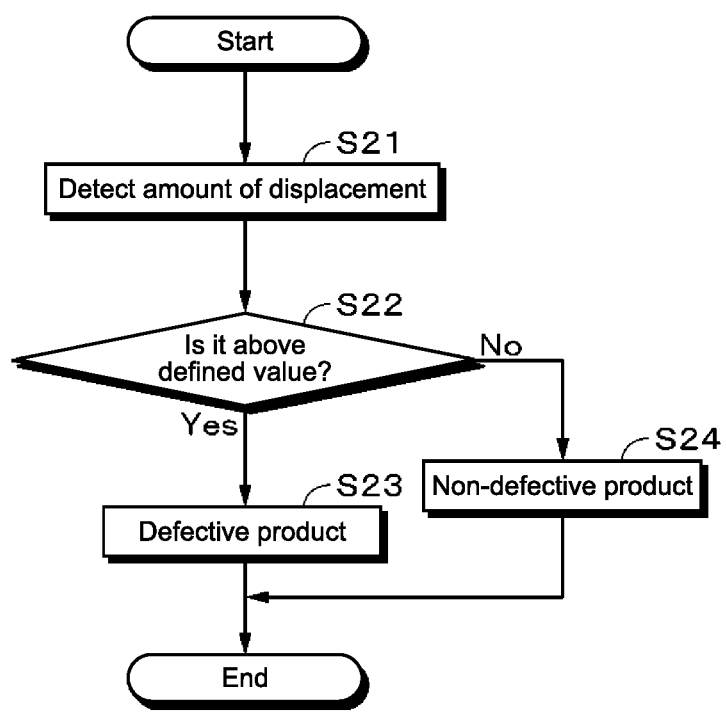
FIG. 11 is a flowchart for explaining an exemplary inspection method according to the second embodiment of the present disclosure.

Next, referring to FIG. 11, an inspection method for the battery using the inspection apparatus having the above-mentioned configuration will be described. This inspection method is different from the inspection method according to the first embodiment in that the inspection apparatus according to the second embodiment further performs the following operations between Steps S14 and S15 shown in FIG. 5.

First, in Step S21, the displacement sensor 51 measures the amount of displacement of a portion of the main surface S1 of the battery 1, which is exposed through the hole portion 32, and provides the measured amount of displacement to the control apparatus 24. Subsequently, in Step S22, the control apparatus 24 determines, based on the amount of displacement provided from the displacement sensor 51, whether or not the amount of displacement is above a defined value. The defined value of the amount of displacement is favorably selected considering the material or the like of the exterior material 12. For example, the defined value is set to be about several tens of microns.

If it is determined in step 22 that the amount of displacement is above the defined value, the control apparatus 24 displays, in Step S23, information indicating that the battery 1 serving as the inspection target is a defective product on the display apparatus 25, to thereby alarm the worker. After that, the display apparatus 25 performs the operation of Step S15 shown in FIG. 5. Otherwise, if it is determined in Step 22 that the amount of displacement is not above the defined value, the control apparatus 24 displays, in Step S24, information indicating that the battery 1 serving as the inspection target is a non-defective product on the display apparatus 25. After that, the operation of Step S15 shown in FIG. 5 is performed.

2.3 Effect

In the inspection apparatus according to the second embodiment, the control apparatus 24 determines, based on the amount of displacement provided from the displacement sensor 51, whether or not the battery 1 serving as the inspection target is a non-defective product. Therefore, in comparison with the visual observation, the determination as to whether or not the battery 1 is a non-defective product can be more accurately made.

Further, a time necessary to change inspection atmosphere into pressurized atmosphere can be shorter than a time necessary to change the inspection atmosphere into vacuum atmosphere. Therefore, the inspection time can be reduced in comparison with the vacuum-type inspection method.

2.4 Modified Example

Figure 10B:
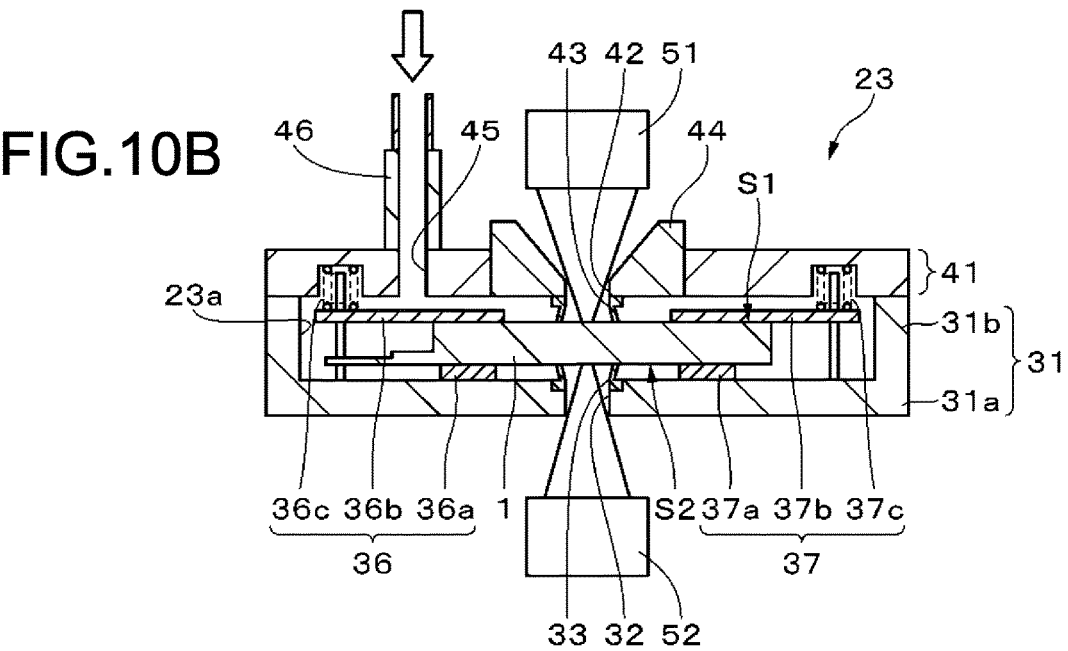
FIG. 10B is a cross-sectional view showing a modified example of the inspection apparatus according to the second embodiment of the present disclosure.

Although the inspection apparatus includes the displacement sensor 51 that measures the amount of displacement of the main surface S1 of the battery 1 through the hole portion 42 in the second embodiment described above, the configuration of the inspection apparatus is not limited thereto. For example, as shown in FIG. 10B, the inspection apparatus may further include a displacement sensor 52 that measures the amount of displacement of the main surface S2 of the battery 1 through the hole portion 32. Further, the inspection apparatus may include only the displacement sensor 52 of the displacement sensors 51 and 52.

In the case where the inspection apparatus includes the two displacement sensors 51 and 52, the control apparatus 24 is provided with a first amount of displacement by the displacement sensor 51 and with a second amount of displacement by the displacement sensor 52. If at least one of the first amount of displacement and the second amount of displacement is above a defined value, the control apparatus 24 determines that the battery 1 is a defective product. In the case where the inspection apparatus includes the two displacement sensors 51 and 52 in this manner, the defection detecting accuracy of the battery 1 can be further enhanced.

Further, although the displacement sensor 51 measures the amount of displacement of the battery surface under the pressurized state of the chamber 23 in the second embodiment described above, the displacement sensor 51 may measure the amount of displacement of the battery surface after opening the chamber 23.

3 Third Embodiment

3.1 Configuration of Chamber

Figure 12A:
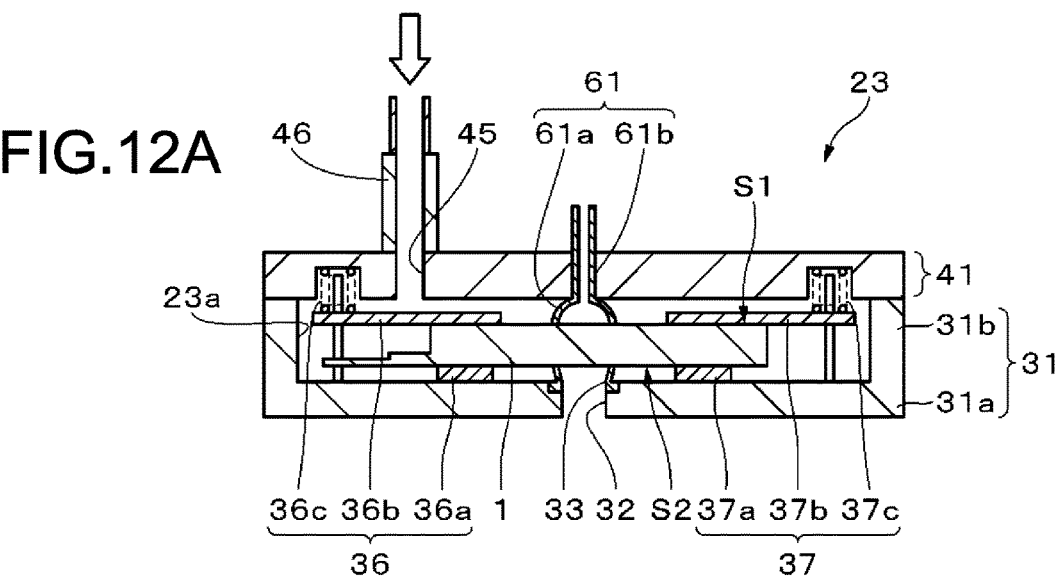
FIG. 12A is a cross-sectional view showing an exemplary configuration of a chamber according to a third embodiment of the present disclosure.

As shown in FIG. 12A, a third embodiment of the present disclosure is different from the first embodiment in that a chamber 23 according to the third embodiment of the present disclosure includes a pad portion 61 instead of the hole portion 42. The pad portion 61 is one of examples of the isolated-space-forming portion that spatially isolates the partial portion of the main surface S1 of the battery 1 within the space portion 23a. The pad portion 61 is communication with the atmosphere outside the chamber 23.

The pad portion 61 includes a pad main-body 61a and a communication portion 61b. The pad main-body 61a has therein a hollow space. Examples of the shape of this space include a semi-spherical shape, a cylindrical shape, and a circular truncated conical shape. The pad main-body 61a is positioned such that a bottom of such a shape is opposed to the main-body portion 31a of the chamber lower portion 31. It should be noted that the shape of the hollow space is not particularly limited to those shapes. For the material of the pad main-body 61a, it is favorable to use a rubber-based material such as a nitrile rubber, a fluoro-rubber, a urethane rubber, a silicone rubber, an acrylic rubber, an ethylene-propylene rubber, and a styrene-butadiene rubber in view of the adhesion to the main surface S1 of the battery 1.

A side of the hollow space of the pad portion 61, which is opposed to the main-body portion 31a of the chamber lower portion 31, is opened and an opposite side thereof is connected to one end of the communication portion 61b. Other end of the communication portion 61b is pulled out of the chamber 23. Through the communication portion 61b, the hollow space of the pad main-body 61a and the atmosphere outside the chamber 23 are in communication with each other. The opened side of the pad main-body 61a is pressed and brought into close contact with the partial portion of the main surface S1 of the battery 1 (e.g., center portion). In this way, an isolated space that isolates the partial portion of the main surface S1 of the battery 1 within the space portion 23a is formed. The communication portion 61b is held at the center of the chamber upper portion 41 such that the pad main-body 61a is movable in a direction closer to or away from the main surface S1 of the battery 1.

3.2 Inspection Method

The inspection method for the battery using the chamber 23 having the above-mentioned configuration further includes a step shown in the following before the pressurization of the chamber 23 (Step S14 in FIG. 5) after the lock of the chamber 23 (Step S13 in FIG. 5). Specifically, the inspection method for the battery further includes the following step. In this step, in such a manner that the opened side of the pad main-body 61a is pressed and brought into close contact with the partial portion of the main surface S1 of the battery 1 (e.g., center portion), an isolated space that isolates the partial portion of the main surface S1 of the battery 1 within the space portion 23a is formed. After this step, the compressed gas such as the compressed air is supplied into the chamber 23. A portion of the space portion 23a other than the isolated space is put in the pressurized atmosphere. On the other hand, the isolated space is kept under an atmosphere-opened state.

3.3 Effect

In the third embodiment, under the pressurized state of the chamber 23, the partial portion of the main surface S1 of the battery 1 can be opened to the atmosphere by the pad portion 61. Thus, the same effects as those of the first embodiment can be obtained.

3.4 Modified Example

Figure 12B:
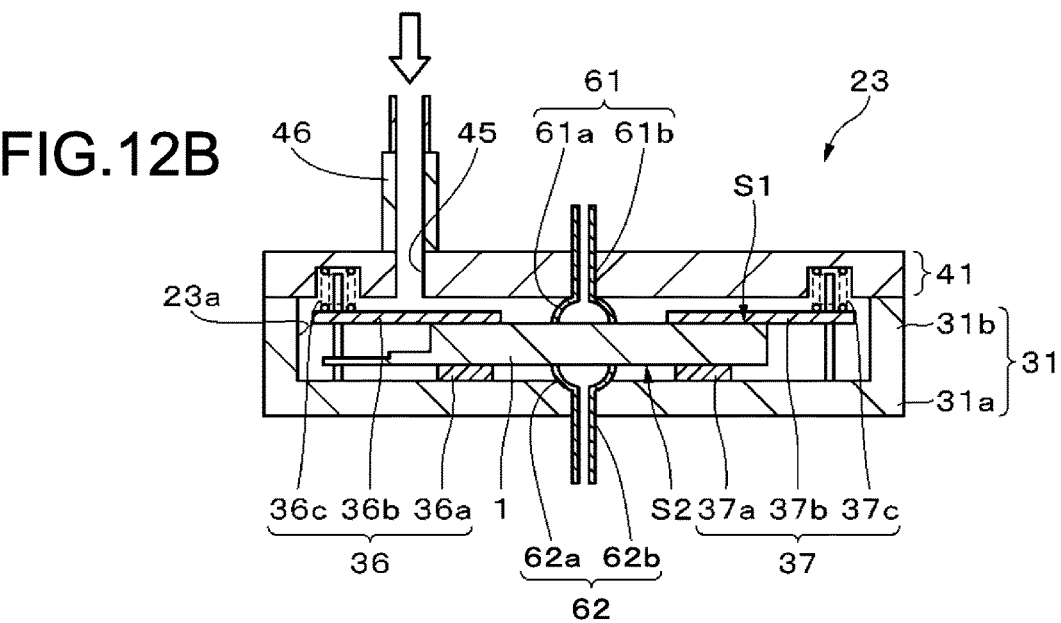
FIG. 12B is a cross-sectional view showing a modified example of the chamber according to the third embodiment of the present disclosure.

Although the inspection apparatus includes the pad portion 61 instead of the hole portion 42 in the third embodiment described above, the configuration of the inspection apparatus is not limited thereto. For example, as shown in FIG. 12B, the inspection apparatus may further include a pad portion 62 instead of the hole portion 32.

Hereinabove, although the first to third embodiments of the present disclosure have been specifically, the present disclosure is not limited to the first to third embodiments described above and various modifications based on the technical concept of the present disclosure may be made.

For example, the configurations, the methods, the processes, the shapes, the materials, the numeral values, and the like exemplified in the first to third embodiments above are merely examples, and different configurations, methods, processes, shapes, materials, numeral values, and the like may be used depending on the needs.

Further, the configurations, the methods, the processes, the shapes, the materials, the numeral values, and the like of the first to third embodiments described above may be combined with one another without departing from the gist of the present disclosure.

Further, although the inspection apparatus inspects the battery in the first to third embodiments described above, the inspection target only needs to have a sealed structure in which the inspection target is sealed by the exterior material such as the laminate film, and the inspection target is not limited to the battery. Examples of the inspection target other than the battery include a medical product, a sealed product in which an electronic component or the like is sealed, and a sealed product in which a pharmaceutical product, confectionery, or retort food is sealed.

Further, the present disclosure may also take the following configurations.

(1) An inspection apparatus, including:
  a chamber including
    a space portion configured to house at least a sealed portion of a battery, and
    an opening portion configured to open a partial portion of the battery other than the sealed portion to an atmosphere; and
  a pressurizer configured to put the space portion into a pressurized state.

(2) The inspection apparatus according to (1), in which
  the opening portion is a hole portion.

(3) The inspection apparatus according to (1), in which
  the opening portion is an isolated-space-forming portion configured to spatially isolate the partial portion of the battery within the space portion, and
  the isolated-space-forming portion is in communication with the atmosphere.

(4) The inspection apparatus according to any one of (1) to (3), further including
  a measurement unit configured to measure the amount of displacement of the partial portion of the battery.

(5) The inspection apparatus according to (4), further including
  a control unit configured to indicate, when the amount of displacement measured by the measurement unit is above a defined value, that a sealing failure is caused via an output unit.

(6) The inspection apparatus according to any one of (1) to (5), in which
  the battery includes
  a battery element, and
  a laminate film with which the battery element is covered.

(7) An inspection method, including:
  housing at least a sealed portion of a battery in a space portion of a chamber; and
  putting the space portion into a pressurized state and opening the partial portion of the battery other than the sealed portion to an atmosphere.

(8) A battery-inspecting chamber, including:
  a space portion configured to house at least a sealed portion of a battery; and
  an opening portion configured to open a partial portion of the battery other than the sealed portion to an atmosphere.

(9) An inspection apparatus, including:
  a chamber including
    a space portion configured to house at least a sealed portion of an inspection target, and
    an opening portion configured to open a partial portion of the inspection target other than the sealed portion to an atmosphere; and
  a pressurizer configured to put the space portion into a pressurized state.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An inspection apparatus, comprising:
  a chamber including (i) a space portion configured to house at least a sealed portion of a battery and (ii) an opening portion configured to open a partial portion of the battery other than the sealed portion to an atmosphere;

a pressurizer configured to put the space portion into a pressurized state; and a measurement unit comprising a displacement sensor configured to measure an amount of swelling deformation of the partial portion of the battery.

2. The inspection apparatus according to claim 1, wherein the opening portion is a hole portion.

3. The inspection apparatus according to claim 1, wherein the opening portion is an isolated-space-forming portion configured to spatially isolate the partial portion of the battery within the space portion, and the isolated-space-forming portion is in communication with the atmosphere.

4. The inspection apparatus according to claim 1, further comprising a control unit configured to indicate, when the amount of swelling deformation measured by the measurement unit is above a defined value, that a sealing failure is caused via an output unit.

5. The inspection apparatus according to claim 1, wherein the battery includes a battery element and a laminate film with which the battery element is covered.

6. The inspection apparatus according to claim 1, further comprising a pressure controller connected to the pressurizer and the chamber and configured to adjust a pressure of a compressed gas supplied from the pressurizer into a predetermined pressure and supply the adjusted compressed gas into the chamber.

7. The inspection apparatus according to claim 1, wherein the chamber further comprises:

a first supporting member and a second supporting member configured to sandwich and support a portion of the battery; and a position adjuster, the position adjuster connected to the second supporting member and configured to adjust a position of the second supporting member.

8. The inspection apparatus according to claim 1, further comprising an exhaust portion configured to put the chamber into a vacuum state.

9. The inspection apparatus according to claim 8, wherein the exhaust portion comprises a vacuum pump.

10. An inspection method, comprising:

housing at least a sealed portion of a battery in a space portion of a chamber;

putting the space portion into a pressurized state and opening the partial portion of the battery other than the sealed portion to an atmosphere; and checking swelling deformation of the partial portion of the battery by using a displacement sensor.

11. The inspection method according to claim 10, wherein checking the swelling deformation comprises visually observing the swelling deformation of the partial portion of the battery.

12. An inspection apparatus, comprising:

a chamber including (1) a space portion configured to house at least a sealed portion of an inspection target and (2) an opening portion configured to open a partial portion of the inspection target other than the sealed portion to an atmosphere;

a pressurizer configured to put the space portion into a pressurized state;

a pressure controller connected to the pressurizer and the chamber and configured to adjust a pressure of a compressed gas supplied from the pressurizer into a predetermined pressure and supply the adjusted compressed gas into the chamber; and a measurement unit comprising a displacement sensor configured to measure an amount of swelling deformation of the partial portion of the inspection target.

13. The inspection apparatus according to claim 12, further comprising a control apparatus (a) connected to the pressurizer and the pressure controller and (b) configured to control the pressurizer and the pressure controller.

14. The inspection apparatus according to claim 13, wherein the control apparatus is configured to control a gas-compressing operation of the pressurizer.

15. The inspection apparatus according to claim 13, wherein the control apparatus is configured to output a control signal to the pressure controller and adjust the pressure of the compressed gas supplied from the pressurizer to the chamber into the predetermined pressure.

16. The inspection apparatus according to claim 12, further comprising a display apparatus connected to the control apparatus, wherein the control apparatus displays, based on a supply signal supplied from the pressure controller, information on a control state of the pressure controller on the display apparatus.

17. The inspection apparatus according to claim 12, wherein the pressure controller comprises an air filter configured to prevent moisture and particles in the compressed gas from entering the pressure controller.

* * * * *